United States Patent
Byrne et al.

(10) Patent No.: US 8,515,041 B2
(45) Date of Patent: Aug. 20, 2013

(54) AUDIO CONFERENCE FEEDBACK SYSTEM AND METHOD

(75) Inventors: Joe Byrne, Dublin (IE); Sean Duddy, Dublin (IE); Gerard O'Sullivan, Dublin (IE)

(73) Assignee: Avaya Inc., Basking Ridge, NJ (US)

( * ) Notice: Subject to any disclaimer, the term of this patent is extended or adjusted under 35 U.S.C. 154(b) by 449 days.

(21) Appl. No.: 12/872,475

(22) Filed: Aug. 31, 2010

(65) Prior Publication Data

US 2012/0051533 A1    Mar. 1, 2012

(51) Int. Cl.
*H04M 3/42*    (2006.01)
*H04M 1/64*    (2006.01)
*H01Q 11/12*   (2006.01)

(52) U.S. Cl.
USPC .............. 379/202.01; 379/88.23; 455/127.2

(58) Field of Classification Search
USPC .......... 379/88.01–88.26, 202.01; 455/127.2, 455/226.4; 705/7.18; 715/719
See application file for complete search history.

(56) References Cited

U.S. PATENT DOCUMENTS

| | | | |
|---|---|---|---|
| 2007/0286386 A1* | 12/2007 | Denenberg et al. | 379/202.01 |
| 2009/0067349 A1* | 3/2009 | Glueckman et al. | 370/260 |
| 2010/0080374 A1 | 4/2010 | Hepworth et al. | |
| 2011/0225013 A1* | 9/2011 | Chavez et al. | 705/7.18 |
| 2012/0082304 A1* | 4/2012 | Byrne et al. | 379/202.01 |
| 2012/0102403 A1* | 4/2012 | Pennington et al. | 715/719 |
| 2012/0295562 A1* | 11/2012 | Sorensen et al. | 455/127.2 |

FOREIGN PATENT DOCUMENTS

WO    WO2009155087 A2    12/2009

OTHER PUBLICATIONS

Ditech Networks, "Voice Enhancement for Conferencing Services," Application Note, http://www.ditechnetworks.com/solutions/solutionsdetail.aspx?pid=44, copyright 2007, last revised Mar. 2007, 2 pages.

\* cited by examiner

*Primary Examiner* — Mohammad Islam (57) ABSTRACT

An audio conference of three or more communication devices is set up. An audio stream of at least one of the communication devices is identified as having an audio signal that is disruptive of the audio conference. For example, a disruption to the audio conference can be where a user has placed the audio conference on hold with music-on-hold, typing without talking, the user is speaking too loudly, the user is speaking too softly, there is echo, there is a bad connection, and the like. A feedback message is sent to the communication device associated with the audio stream with the disruptive signal. The feedback message can cause the user of the communication device who is disrupting the audio conference to take action without disrupting other participants in the audio conference.

20 Claims, 5 Drawing Sheets

AUDIO CONFERENCE FEEDBACK SYSTEM AND METHOD

TECHNICAL FIELD

The system and method relates to audio conference systems and in particular to audio conference systems that provide feedback to users.

BACKGROUND

Today, audio conference calls are a staple of business. Conference calls allow groups of people at different locations to easily communicate with each other. In a typical conference call, different users will call in to discuss different subjects. The more people that are on the conference call, the more likely that different types of disruptions to the conference call will occur.

For instance, different people may multi-task during the conference call during specific sections of the conference call that are not as interesting. This leads to the situation where someone, for example, may be typing during the conference call and all the other persons on the call get to hear the person type. Someone will typically disrupt the conference call and ask the person who is typing to stop typing or to press the mute button so that the rest of the participants don't have to listen to the typing.

Another problem is where someone is on the conference call and receives another, more important call. The person places the conference call on hold and takes the more important call. If the person who placed the conference call has music-on-hold, then the rest of the conference call participants now have the privilege of listening to music-on-hold. This is not only very disruptive to the conference, but also if you try and ask the person to go off hold, they will not be able to hear you because they have placed the conference call on hold.

Other disruptions include where echo and/or bad connections cause a speaker's signal to break up, causing other people on the conference call to ask them to repeat what they said. In these situations, the person may have to drop from the conference call and redial in order to get a better connection. What is needed is a better way to identify the source of various disruptions and provide feedback to specific users of the conference call without disrupting the conference call.

SUMMARY

The system and method are directed to solving these and other problems and disadvantages of the prior art. An audio conference of three or more communication devices is set up. An audio stream of at least one of the communication devices is identified as having an audio signal that is disruptive of the audio conference. For example, a disruption to the audio conference can be where a user has placed the audio conference on hold with music-on-hold, typing without talking, the user is speaking too loudly, the user is speaking too softly, there is echo, there is a bad connection, and the like. A feedback message is sent to the communication device associated with the audio stream with the disruptive signal. The feedback message can cause the user of the communication device who is disrupting the audio conference to take action without disrupting other participants in the audio conference.

Other embodiments include options to send a signal to automatically mute the communication device. In addition, the sending of the feedback message can be based on a Graphical User Interface that allows the user to select which user to send the feedback message.

Another embodiment allows for the communication device that is disrupting the audio conference to be dropped from the audio conference. The communication device can be re-added to the audio conference in different ways, which can improve the quality of the audio conference.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Some embodiments will be illustrated below in conjunction with an exemplary communication system. Although well suited for use with, e.g., a system using switch(es), server(s) and/or database(s), communications endpoints, etc., the embodiments are not limited to use with any particular type of communication system or configuration of system elements. Those skilled in the art will recognize that the disclosed techniques may be used in any communication application in which it is desirable to provide enhanced audio conferencing.

Figure 1:
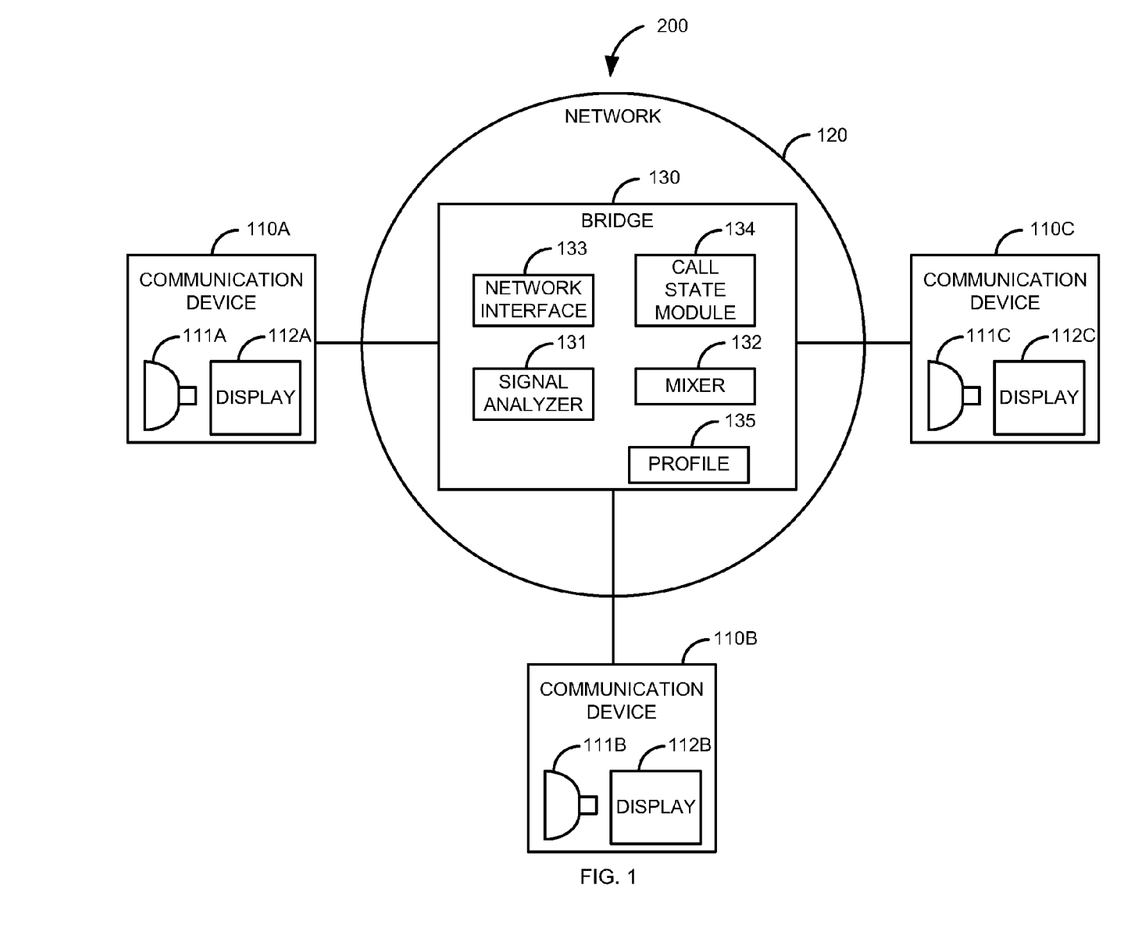
FIG. 1 is a block diagram of a first illustrative system for identifying disruptive users of an audio conference and providing feedback to the disruptive users of the audio conference.

FIG. 1 is a block diagram of a first illustrative system 100 for identifying disruptive user(s) of an audio conference and providing feedback to the disruptive user(s) of the audio conference. First illustrative system 100 comprises communication devices 110A-110C, network 120, and bridge 130. Communication device 110 can be any type of communication device 110 that can send and receive an audio signal, such as a telephone, a cellular telephone, a personal computer, a video phone, a Personal Digital Assistant (PDA), a server, a router, and the like. Communication devices 110A-110C further comprise speaker 111 and display 112. Speaker 111 can be any device that can convey sound, such as a speaker, a buzzer, and the like. Display 112 can be any type of display such as a Liquid Crystal Display (LCD), a monitor, a television, and the like. Communication device 110 can also comprise other input devices, such as a keyboard (not shown), keypad (not shown), and the like.

Network 120 can be any type of network such as a Local Area Network (LAN), a Wide Area Network (WAN), the Public Switched Telephone Network (PSTN), a cellular network, the Internet, a combination of these, and the like. Communication devices 110A-110C are shown as connecting to bridge 130 via network 120. However, any one or all of communication devices 110A-110C can directly connect to bridge 130 without network 120.

Bridge 130 can be any device capable of receiving audio streams (or an audio stream of a video signal) for an audio conference such as a switch, a server, a Private Branch Exchange (PBX), a communication device 110 (i.e., in a peer-to-peer network), a video server, and the like. Bridge 130 further comprises signal analyzer 131, mixer 132, network interface 133, call state module 134, and profile 135. Signal analyzer 131 can be any hardware/software that can analyze a signal, such as a Digital Signaling Processor (DSP), a general purpose processor, signal processing software, and the like. Mixer 132 can be any hardware/software that can mix different audio signals, such as a PBX, a server, a processor, and the like. Network interface 133 can be any type of hardware/software that can send/receive information, such as an Ethernet interface, a fiber optic card, a modem, a wireless interface (e.g., 802.11), a cellular interface, and the like. Call state module 134 can be any call state software/hardware that can analyze different call states of an audio/video call, such as a PBX, a central office switch, and the like. Profile 135 can be any stored information that defines how bridge 130 operates. For example, profile 135 can be a series of Extended Markup Language (XML) scripts that identify how bridge 130 will respond to different kinds of disruptions to the audio conference.

Bridge 130 is shown as a single element; however, bridge 130 can be distributed between multiple devices/systems. For example, bridge 130 can be distributed in different communication devices 130 in a peer-to-peer network (not shown) where multiple communication devices 100 provide mixing services for the audio conference. For illustrative purposes, signal analyzer 131, mixer 132, network interface 133, call state module 134, and profile 135 are shown as part of bridge 130; however, signal analyzer 131, mixer 132, network interface 133, call state module 134, and profile 135 can be separate from bridge 130.

In setting up an audio conference, three or more communication devices 110A-110C call bridge 130. After the audio calls from communication devices 110A-110C are set up, communication devices 110A-110C each send an audio stream to network interface 133, thus forming the audio conference. Mixer 132 mixes the audio signals from communication devices 110A-110C and sends the mixed audio signals to communication devices 110. To illustrate how this works, mixer 132 sends the mixed audio signals of communication devices 110B-110C to communication device 110A. Likewise, mixer 132 sends the mixed audio signals of communication devices 110A-110B to communication device 110C and sends the mixed audio signals from communication devices 110A and 110C to communication device 110B.

Signal analyzer 131 analyzes the three or more audio streams from communication devices 110A-110C in order to identify an audio signal(s) in the audio streams that is disruptive of the audio conference. There are various ways that an audio signal can disrupt an audio conference, such as a person typing, music-on-hold, echo, poor signal quality, a user is speaking too loudly, a user is speaking too softly, a user is making a lot of noise (e.g., shuffling papers) while not talking, a user is breathing heavily, and the like.

Signal analyzer 131 identifies a communication device 110 associated with the audio stream that is disruptive of the audio conference. Network interface 133 sends a feedback message to the associated communication device 110 that is disrupting the audio conference. In this example, only a single audio stream is disrupting the audio conference. However, signal analyzer 131 can detect more than one of the audio streams (perhaps all of the audio streams) that are disrupting the audio conference and send an appropriate feedback message.

To illustrate the above concept, consider the following illustrative example. Users of communication devices 110A-110C call bridge 130 to set up an audio conference. Communication devices 110A-110C send their associated audio streams to bridge 130. Network interface 133 receives the audio streams from communication devices 110A-110C, which form the audio conference. Signal analyzer 131 identifies an audio stream from communication device 110A that contains an audio signal that is disruptive of the audio conference. Signal analyzer 131 identifies the disruptive audio stream from communication device 110A because call state module 134 has determined that communication device 110A has changed it state to hold (with music-on-hold).

After identifying that communication device 110A is disrupting the audio conference with music-on-hold, a feedback message is sent via network interface 133 to associated communication device 110A indicating to the user of communication device 110A that they are disrupting the audio conference with music-on-hold. Communication device 110A receives the feedback message and displays the feedback message in display 112A to the user of communication device 110A.

In the above example the feedback message is a text message to the user of communication device 110A; however, the feedback message could be an audio feedback message that is communicated to the user of communication device 110A via speaker 111A. Likewise, in this illustration, only one of the three audio signals was identified as disrupting the audio conference; however, if communication devices 110B and/or 110C are identified as disrupting the audio conference, similar feedback messages can be sent and displayed and/or sounded in displays/speakers 112B, 112C, 111B, and/or 111C.

Figure 2:
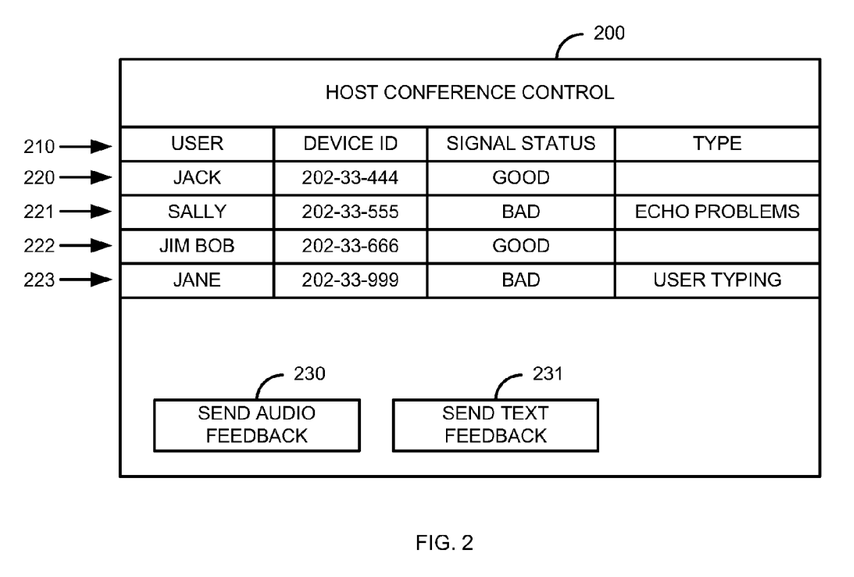
FIG. 2 is a diagram of a Graphical User Interface (GUI) that identifies users of an audio conference that are disrupting the audio conference.

FIG. 2 is a diagram of a Graphical User Interface (GUI) 200 that identifies user(s) of an audio conference that are disrupting the audio conference. GUI 200 comprises user list 210. User list 210 comprises a list of users 220-223. For each user in user list 210, a user name field, a communication device identifier (ID) field, a signal status field, and a type field are displayed. The name field is a name of a user of the audio conference. The communication device ID field is a number that uniquely identifies a communication device 110, such as an Ethernet number or an IP address. The signal status field is an indication of whether or not the participant's signal is disrupting the audio conference. The type field indicates the type of problem(s) (e.g., the disruption can be typing and echo) that are disrupting the audio conference. For example, user Sally 221 is causing disruptions to the conference call due to echo problems. Likewise, user Jane 223 is disrupting the conference call due to typing.

GUI 200 also comprises a send audio feedback button 230 and a send text feedback button 231. The send audio feedback button 230 sends an audio feedback signal to selected participant(s) 220-223 who are disrupting the audio conference. The send text feedback button 231 sends a text feedback signal to selected user(s) who are disrupting the audio conference.

For example, a host of the audio conference can use GUI 200 and initiate the sending of a feedback message containing an audio signal to a user who is disrupting the audio conference. The host can select participant Sally 220 using a mouse and then click on the send audio feedback button 230 to send an audio signal to Sally. The audio feedback signal can be sent in different ways, such as in place of a mixed audio conference signal, mixed in with the mixed audio conference signal, as a separate audio stream, and/or the like. Likewise, the host can send a text feedback message by selecting a user that is disrupting the audio conference and then clicking on the send text feedback button 231.

Figure 3:
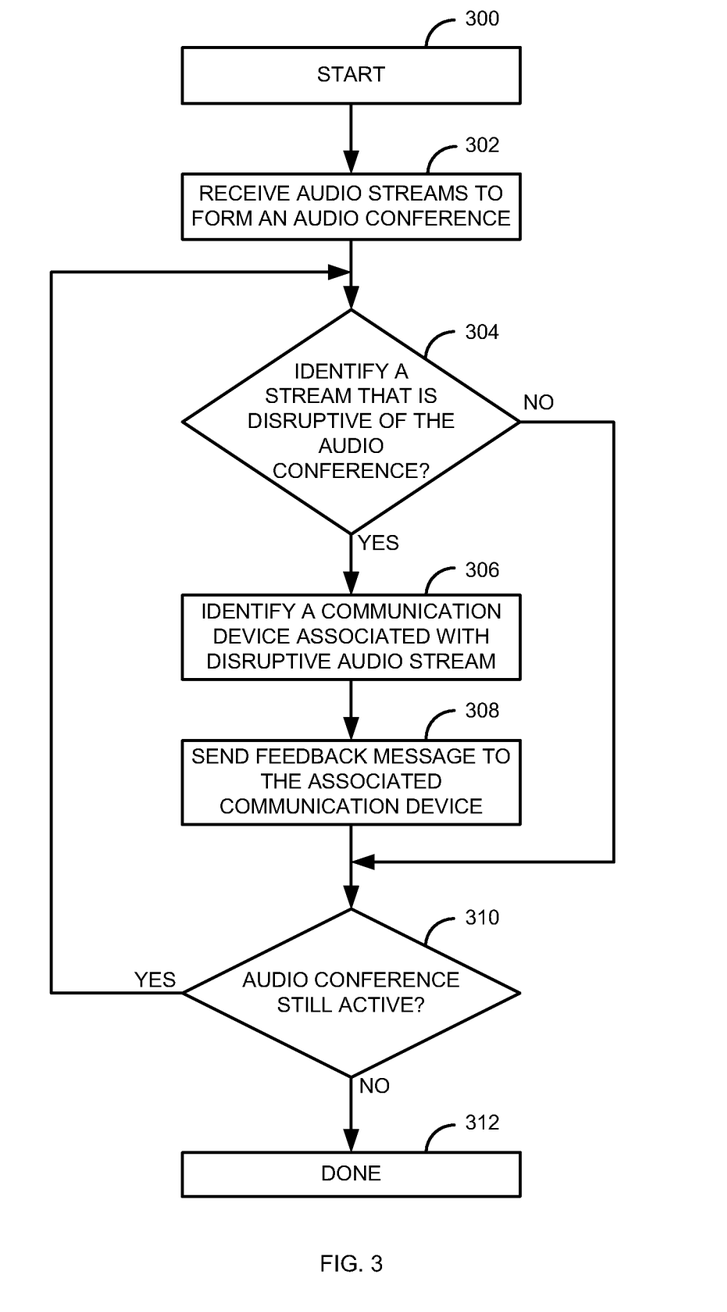
FIG. 3 is a flow diagram of a method for identifying disruptive users of an audio conference and providing feedback to the disruptive users of the audio conference.

FIG. 3 is a flow diagram of a method for identifying disruptive users of an audio conference and providing feedback to the disruptive users of the audio conference. Illustratively, communication device 110, bridge 130, network analyzer 131, mixer 132, network interface 133, and call state module 134 are stored-program-controlled entities, such as a computer or processor, which performs the method of FIGS. 3-5 and the processes described herein by executing program instructions stored in a tangible computer readable storage medium, such as a memory or disk.

The process starts in step 300. Network interface 133 receives three or more audio streams from communication devices 110 to form an audio conference in step 302. Signal analyzer 131 tries to identify a stream of the three or more audio streams that contains an audio signal that is disruptive of the audio conference in step 304. If signal analyzer 131 cannot identify an audio stream that contains an audio signal that is disruptive of the audio conference in step 304, the process goes to step 310.

Otherwise, if signal analyzer 131 can identify an audio stream that contains an audio signal that is disruptive of the audio conference in step 304, signal analyzer 131 identifies a communication device 110 associated with the disruptive audio stream in step 306. Signal analyzer 131 can identify a disruptive audio signal in an audio stream in a variety of ways, such as based on echo in the audio stream and/or other types of signal quality, such as a poor connection. Signal analyzer 131 can identify user disruptions in the audio signal, such as the user is speaking too softly (i.e., causing others to ask the speaker to speak up), the user is speaking too loudly (i.e., causing others to ask the speaker to not speak so loudly), the user is making a lot of noise while not talking, the user is breathing too heavily, and the like.

Network interface 133 sends a feedback message indicating the nature of the disruption to the associated communication device 110 in step 308. Call state module 134 determines in step 310 if the audio conference is still active. If the audio conference is still active in step 310, the process goes to step 304. Otherwise, if the audio conference is no longer active in step 310, the process is done 312.

Figure 4:
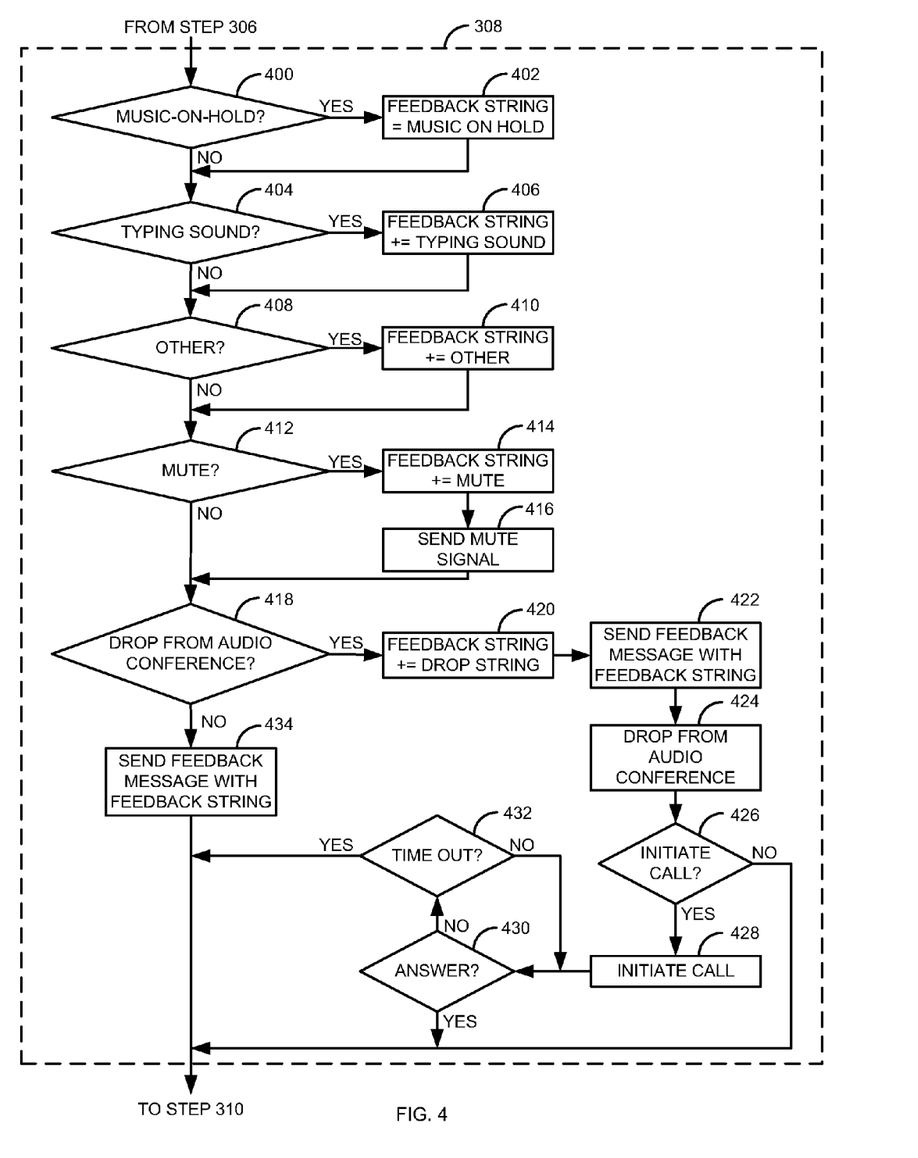
FIG. 4 is a flow diagram of a method for sending feedback to a communication device.

FIG. 4 is a flow diagram of a method for sending feedback to communication device 110. FIG. 4 is an exemplary expanded view of step 308 in FIG. 3. After identifying a communication device 110 associated with the disruptive audio stream in step 306, signal analyzer 131 determines in step 400 if the disruption in the audio signal is music-on-hold. Signal analyzer 131 can determine that the disruption to the audio signal is music-on-hold in a variety of ways such as an analysis of the audio stream of the associated communication device 110, based on a signal from the associated communication device 110, based on a call state indication (i.e., received from a PBX), and the like. If the disruption is music-on-hold in step 400, the feedback text string is set to the music-on-hold music notice in step 402 and the process goes to step 404. Otherwise, if the disruption is not music-on-hold in step 400, the process goes to step 404.

In step 404, signal analyzer 131 determines if the disruption in the audio signal is a typing sound. Signal analyzer 131 can determine the typing sound by examining the identified audio stream. As an alternative, signal analyzer 131 can also determine if the person is talking while typing and only append the typing string to the feedback string if the person is not talking in step 406; this can be accomplished based on a period of time (e.g., if the person is not talking and typing for 5 seconds). If the disruption in the audio signal is a typing sound, signal analyzer 131 appends the typing sound string (e.g., telling the user to stop typing) to the feedback string in step 406 and the process goes to step 408. Otherwise, if the disruption in the audio signal is not a typing sound, the process goes to step 408.

In step 408, signal analyzer 131 determines if the disruption in the audio signal is another type of disruption, such as echo, a user is making noise while not talking, the user is speaking too softly, the user is speaking too loudly, a bad connection, a low signal to noise ratio in the audio signal, and the like. If the disruption in the audio signal is another type of disruption in step 408, signal analyzer 131 appends the other string (i.e., a string that represents the type of disruption) to the feedback string in step 410 and the process goes to step 412. Otherwise, if there is not another type of disruption in the audio signal in step 408, the process goes to step 412.

In step 412, signal analyzer 131 determines whether to send a mute signal to the associated communication device 110. Signal analyzer 131 can determine whether to send the mute signal based on different criteria, such as based on a profile 135 (e.g., mute if music-on-hold and mute if typing while not talking), the type of the disruption, the severity of the disruption (i.e., a ranking of each type of disruption), user defined preferences (e.g., a host's preferences), a person's status (e.g., the boss does not get muted while a lower level employee can get muted for the same disruption), a combination of these, and the like. If signal analyzer 131 determines in step 412 to send the mute signal to the associated communication device 110, signal analyzer 131 appends the mute string to the feedback string in step 414. Network interface 133 sends the mute signal to the associated communication device 110 in step 416 and the process goes to step 418. Otherwise, if signal analyzer 131 determines not to send a mute signal in step 412, the process goes to step 418.

In step 418, call state module 134 determines whether to drop associated communication device 110 from the audio conference. Call state module 134 can drop associated communication device 110 from the audio conference for a variety of reasons. For instance, call state module 134 can drop the associated communication device 110 based on a profile 135 (e.g., drop if music-on-hold, but don't drop if typing), the type of the disruption, the severity of the disruption (i.e., a ranking of each type of disruption), user-defined preferences (e.g., a host's preferences), a person's status (e.g., the boss does not get dropped while a lower level employee can get dropped for the same disruption), a combination of these, and the like. If call state module 134 determines not to drop the associated communication device 110 from the audio conference in step 418, network interface 133 sends the feedback message with the feedback string to the associated communication device 110 and the process goes to step 310.

Otherwise, if call state module 134 determines to drop the associated communication device 110 from the audio conference in step 418, signal analyzer 131 appends the drop string to the feedback string in step 420. Network interface 133 sends the feedback message with the feedback string to the associated communication device 110 in step 422. Call state module 134 drops the associated communication device 110 from the audio conference in step 424.

Call state module 134 determines in step 426 whether to initiate a call to the associated communication device 110 (i.e., the associated communication device 110 that was dropped from the audio conference in step 424). Call state module 134 can initiate a call back to the associated communication device 110 based on various factors, such as based on profile 135 (e.g., call back bad connection or echo over a specific threshold), the type of the disruption, the severity of the disruption (i.e., a ranking of each type of disruption), user-defined preferences (e.g., a host's preferences), a person's status (e.g., the boss gets called back while a lower level employee does not get called back for the same disruption), a combination of these, and the like. If call state module 134 determines not to initiate a call to the associated communication device 110 in step 426, the process goes to step 310.

Otherwise, if call state module 134 determines to initiate a call to the associated communication device 110 in step 426, call state module 134 initiates the call to the associated communication device 110 in step 428. Call state module 134 waits for an answer from the associated communication device 110 in step 430. If associated communication device 110 answers in step 430, the process goes to step 310. Otherwise, if an answer is not received from associated communication device 110 in step 430, call state module 134 determines if a timeout has occurred in step 432. If a timeout has not occurred in step 432, the process goes back to step 430. Otherwise, if a timeout has occurred in step 432, the process goes to step 310.

Steps 426, 428, 430, and 432 describe a way for call state module 134 to re-add associated communication device 110 to the audio conference. However, instead of call state module 134 calling associated communication device 110, call state module 134 can receive a call request from the associated communication device 110 in order to re-add associated communication device 110 to the audio conference. Associated communication device 110 can automatically call bridge 130 via network interface 133 based on being dropped from the audio conference in step 424 (e.g., the call drop message can contain an indication for associated communication device 110 to automatically call back).

To illustrate the method of FIG. 4, consider the following illustrative example. Signal analyzer 131 identifies in steps 304 and 306 an audio stream from communication device 110C that is disrupting the audio conference. Signal analyzer 131 determines in step 400 that the user of communication device 110C has placed the audio conference on hold with music-on-hold (the disruption). The feedback string is set to "You are playing music-on-hold to the audio conference you placed on hold." in step 402. Signal analyzer 131 does not detect any typing sounds or other disruptions in steps 404 and 408.

Based on profile 135, signal analyzer 131 determines to send a mute signal to communication device 110C in step 412. A text string "You have been muted." is appended to the feedback text string in step 414. The feedback text string is now "You are playing music-on-hold to the audio conference you placed on hold. You have been muted." Network interface 133 sends the mute signal to associated communication device 110C in step 416. Based on profile 135, call state module 134 does not drop communication device 110C from the audio conference in step 418. Network interface 133 sends the feedback message with the feedback string "You are playing music-on-hold to the audio conference you placed on hold. You have been muted." in step 434 to associated communication device 110C. Communication device 110C receives the mute signal and the feedback message; communication device 110C then mutes the music-on-hold and displays the feedback message on display 112C to the user of communication device 110C.

To further illustrate the process of FIG. 4, consider a second illustrative example. Signal analyzer 131 identifies in step 304 and 306 an audio stream from communication device 110A that is disrupting the audio conference. Signal analyzer 131 determines in steps 400 and 404 that the disruption is not music-on-hold or a typing sound. In step 408, signal analyzer 131 determines that the disruption is a bad connection from communication device 110A. Signal analyzer 131 sets the feedback string to "The system has determined that you have a bad connection to the audio conference." in step 410. Based on the user preference in profile 135, a mute signal is not to be sent in step 412.

However, the user preference in step 418 is to drop communication devices 110 with bad connections (i.e., over a specific signal to noise ratio). The string "You will be dropped from the audio conference and re-added." is appended to the feedback string in step 420. The feedback message with the feedback string "The system has determined that you have a bad connection to the audio conference. You will be dropped from the audio conference and re-added." is sent to communication device 110A in step 422. Call state module 134 then drops communication device 110A from the audio conference in step 424. Communication device 110A receives the feedback message and displays the feedback message to the user of communication device 110A on display 112A.

Based on the user-defined preferences in profile 135, call state module 134 determines in step 426 to initiate a call to communication device 110A. A call is made to communication device 110A in step 428. Communication device 110A answers the call (either automatically or the user answers) in step 430 and communication device 110A is again part of the audio conference.

Figure 5:
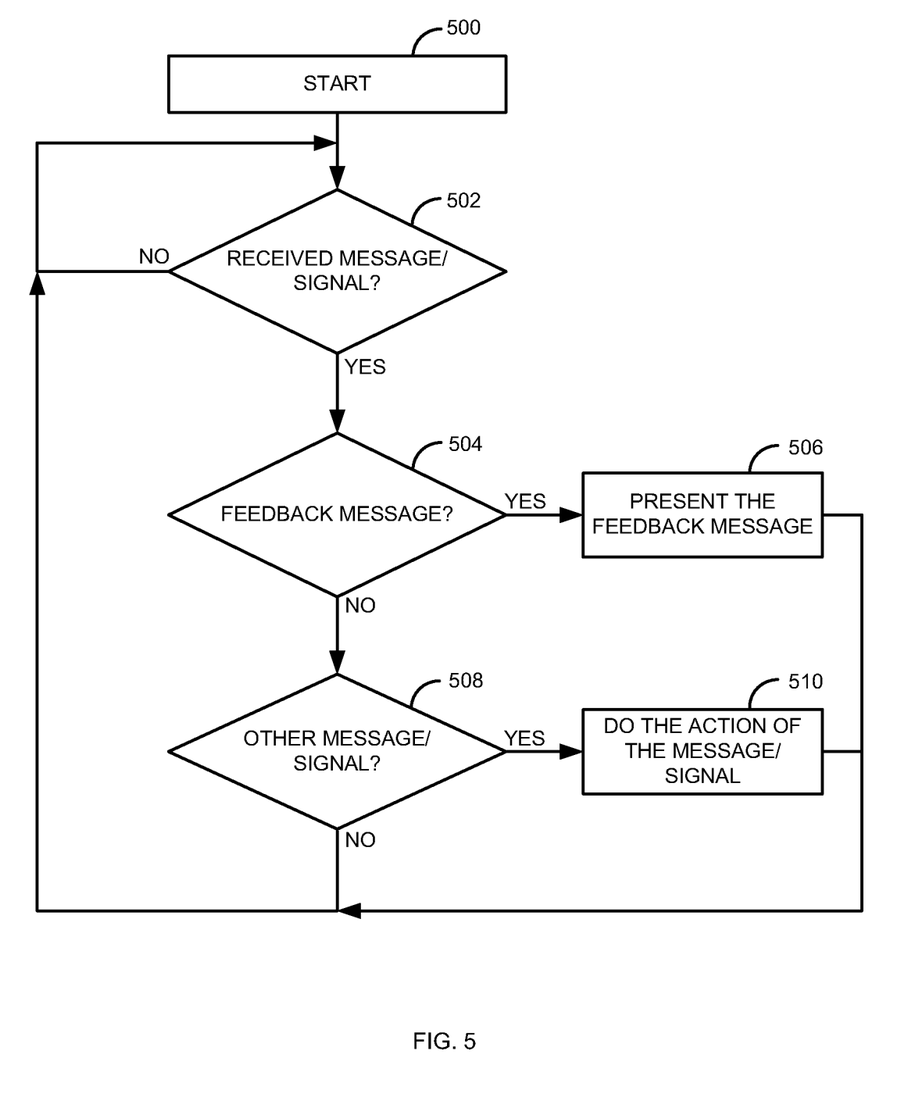
FIG. 5 is a flow diagram of a method for receiving and displaying feedback messages on a communication device.

FIG. 5 is a flow diagram of a method for receiving and displaying feedback messages on communication device 110. The process starts in step 500. Communication device 110 waits to receive a feedback message/signal in step 502. If communication device 110 does not receive a feedback message in step 502, the process waits in step 502. Otherwise, if the message/signal is received in step 502, communication device 110 determines if the message/signal is a feedback message in step 504. If a feedback message is received in step 504, communication device 110 presents the feedback message in step 506 and the process goes to step 502. A feedback message can be presented in a variety of ways. For example, if the feedback message is a text message, the feedback message can be displayed in display 112 and/or can be converted to text and played via speaker 111. If the feedback message is an audio message (e.g., embedded into the audio stream or via a separate audio stream), the feedback message can be played via speaker 111.

Otherwise, if the message/signal is not a feedback message in step 504, communication device 110 determines if the message/signal is another signal (e.g., the mute signal sent in step 416), communication device 110 does the action of the other message/signal in step 510 and the process goes to step 502. Otherwise, if the received message/signal is not another message/signal, the process goes to step 502.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   a. receiving three or more audio streams at a network interface, each from a communication device, the three or more audio streams forming an audio conference;
   b. identifying by a signal analyzer, an audio stream of the three or more audio streams that contains an audio signal that is disruptive of the audio conference;
   c. identifying by the signal analyzer, a communication device associated with the identified audio stream; and
   d. sending a feedback message from the network interface to the communication device associated with the identified audio stream,
   wherein the audio signal that is disruptive is identified as comprising a particular type of disruptive audio signal, wherein the audio signal contains music-on-hold, the feedback message instructs the users that they are disrupting the audio conference with music-on-hold, and further comprising the step of identifying the music-on-hold prior to sending the feedback message.

2. The method of claim 1, further comprising the step of sending a signal to the associated communication device that mutes the associated communication device and wherein the feedback message tells a user of the associated communication device that the associated communication device has been muted.

3. The method of claim 1, further comprising a Graphical User Interface (GUI) that shows the status of the three or more audio streams and wherein a user of the GUI can initiate the sending of the feedback message.

4. The method of claim 1, wherein the step of identifying the music-on-hold is accomplished by at least one of the following: an analysis of the audio stream of the associated communication device, based on a signal from the associated communication device, and based on a call state indication.

5. The method of claim 1, wherein the audio signal comprises a typing sound, the feedback message tells a user of the associated communication device to stop typing and/or to mute, and further comprising the step of identifying the typing sound prior to sending the feedback message.

6. The method of claim 5, wherein the step of identifying the typing sound further comprises identifying the typing sound by analyzing the audio stream and further comprising the step of determining that a user of the associated communication device is not talking while typing.

7. The method of claim 1, further comprising the steps of receiving the feedback message at the associated communication device and presenting the feedback message to a user of the associated communication device.

8. The method of claim 1, wherein the feedback message is that the user will be dropped from the audio conference and further comprising the steps of: dropping the associated communication device from the audio conference and doing one of the following: i. calling the associated communication device in order to re-add the associated communication device to the audio conference; or ii. receiving a call request from the associated communication device in order to re-add the associated communication device to the audio conference.

9. The method of claim 1, wherein the feedback message is at least one of the following: that a user is disrupting the conference based on echo, the user is disrupting the conference, the user is speaking too softly, the user is speaking too loudly, the user is making a lot of noise while not talking, the user is breathing too heavily, and telling the user to mute.

10. The method of claim 1, wherein the feedback message comprises an audio feedback signal and wherein the audio feedback signal is sent in one of the following ways: in place of a mixed audio conference signal, mixed in with the mixed audio conference signal, or as a separate audio stream.

11. A system comprising:
    a. a network interface configured to receive three or more audio streams, each from a communication device, the three or more audio streams forming an audio conference, and send a feedback message to an associated communication device;
    b. a signal analyzer configured to identify an audio stream of the three or more audio streams that contains an audio signal that is disruptive of the audio conference and identify the communication device associated with the identified audio stream, wherein the audio signal that is disruptive is identified as comprising a particular type of disruptive audio signal, wherein the audio signal comprises a typing sound, the feedback message tells a user of the associated communication device to stop typing and/or to mute, and the signal analyzer is further configured to identify the typing sound prior to sending the feedback message.

12. The system of claim 11, wherein the network interface is further configured to send a signal to the associated communication device that mutes the associated communication device and wherein the feedback message tells a user of the associated communication device that the associated communication device has been muted.

13. The system of claim 11, further comprising a Graphical User Interface (GUI) that shows the status of the three or more audio streams and wherein a user of the GUI can initiate the sending of the feedback message.

14. The system of claim 11, wherein the audio signal contains music-on-hold, the feedback message instructs the user that they are disrupting the audio conference with music-on-hold, and the signal analyzer is further configured to identify the music-on-hold prior to sending the feedback message.

15. The system of claim 11, wherein identifying the music-on-hold is accomplished by at least one of the following: an analysis of the audio stream of the associated communication device, based on a signal from the associated communication device, and based on a call state indication.

16. The system of claim 11, wherein the audio analyzer is further configured to identify the typing sound by analyzing the audio stream and determine that a user of the associated communication device is not talking while typing.

17. The system of claim 11, wherein the associated communication device is configured to receive the feedback message and present the feedback message to a user of the associated communication device.

18. The system of claim 11, wherein the feedback message is that the user will be dropped from the audio conference and a call state module is configured to drop the associated communication device from the audio conference and doing one of the following:

i. call the associated communication device in order to re-add the associated communication device to the audio conference; or ii. receive a call request from the associated communication device in order to re-add the associated communication device to the audio conference.

19. The system of claim 11, wherein the feedback message is at least one of the following: that a user is disrupting the conference based on echo, the user is disrupting the conference, the user is speaking too softly, the user is speaking too loudly, the user is making a lot of noise while not talking, the user is breathing too heavily, and telling the user to mute.

20. The system of claim 11, wherein the feedback message comprises an audio feedback signal and wherein the audio feedback signal is sent in one of the following ways: in place of a mixed audio conference signal, mixed in with the mixed audio conference signal, or as a separate audio stream.

* * * * *